United States Patent [19]

Kirwan

[11] 3,711,118
[45] Jan. 16, 1973

[54] TRANSPORTATION TRAILER LANDING GEAR

[75] Inventor: George B. Kirwan, Huntington, W. Va.

[73] Assignee: Hennessy Products, Incorporated, Chambersburg, Pa.

[22] Filed: Dec. 4, 1970

[21] Appl. No.: 95,159

[52] U.S. Cl. ............................................. 280/150.5
[51] Int. Cl. .................................................. B60s 9/02
[58] Field of Search.280/150.5 R, 475, 476 R, 423 R

[56] References Cited

UNITED STATES PATENTS 3,046,037   7/1962   Cain ................................. 280/475
3,235,285   2/1966   Tenenbaum ..................... 280/423 R
3,146,002   8/1964   Faber ................................ 280/150.5
836,975   11/1906   Johnson ........................... 280/476 R Primary Examiner—Kenneth H. Betts
Assistant Examiner—Robert R. Song
Attorney—Bedell & Burgess

[57] ABSTRACT

Trailer vehicle and landing gear support structure therefor providing for the lateral yielding of the lower end of an upright support when its lower end engages an obstacle on the ground as the trailer is being moved about and preferably preventing such lateral yielding when the landing gear is functioning to support the trailer.

5 Claims, 5 Drawing Figures

PATENTED JAN 16 1973

3,711,118

INVENTOR:
George B Kirwan
By Bedell and Burgess
ATTORNEYS

TRANSPORTATION TRAILER LANDING GEAR

SUMMARY OF THE INVENTION

The invention comprises a housing on the bottom of a trailer body and an upright support leg with its upper end attached to the housing, preferably by telescoping elements, which maintain the leg upright when it is supporting the trailer body but permits the lower end of the leg to swing transversely when the leg is relieved of supporting the trailer.

Figure 1:
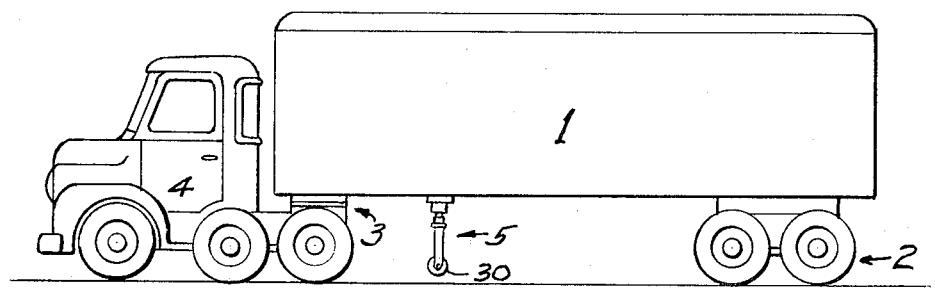
FIG. 1 is a side view of a vehicle trailer with usual vehicle wheels at the rear end and with the front end supported on a cab truck and with a nonfunctioning landing gear near its front end.

The trailer 1 includes rear wheels 2 and a fifth wheel 3 at its forward end mounted on the bed of a cab truck 4 for movement of the trailer on the highway, in a warehouse, a parking space, or onto a railway flatcar.

Landing gear 5 corresponds to such devices as generally used but it includes a downwardly opening structure accommodating inclination of its main leg comprising a housing 7 having a top plate 8 for attachment to frame cross members 10 supporting the trailer floor 12.

Near its lower end, housing 7 has a smaller internal diameter neck 13 forming an upwardly facing shoulder 14. A piston-like socket member 16 is slidable vertically in housing 7 and has a downwardly facing shoulder 17 opposing shoulder 14. A coil spring 18 seated against the underside of plate 8 thrusts socket 16 downwardly into the position shown in FIGS. 2 and 5. A ball element 20 with a downwardly extending stem 21 is seated in socket 16.

An elongated tubular support leg 24 has a reduced diameter upper shank 25 threaded or welded to stem 21. A coil spring 27 loosely surrounds stem 21 and is compressed between the bottom face of socket 16 and the upper end of shank 25 and normally positions the support leg in vertical alignment with the housing for telescoping movement into housing 7 but accommodates inclination of the socket and leg. A collar 29 on leg 24 opposes the bottom of housing 7 and limits the telescoping action of the leg and housing.

Figure 3:
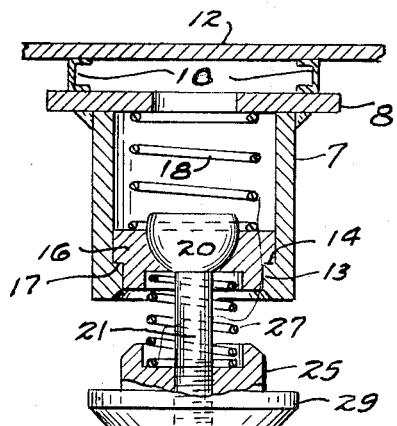
FIG. 3 is a similar section of the upper portion of the landing gear in the position assumed when supporting the front portion of the trailer body.
Figure 2:
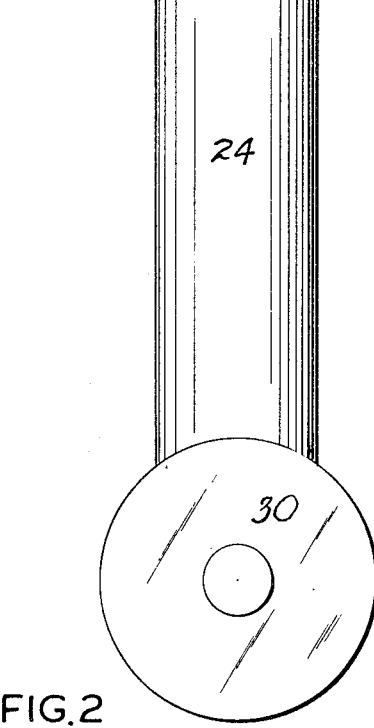
FIG. 2 is a vertical section through the unloaded landing gear indicated in FIG. 1 but drawn to a larger scale.

A wheel 30 is journaled on the lower end of leg 24. When the trailer is supported as shown in FIG. 1, springs 18 and 27 position the support leg as shown in FIG. 2, the downward thrust of spring 18 being limited by engagement of shoulders 14 and 17. When the cab truck is removed, the trailer is supported by the landing gear and spring 18 is compressed as shown in FIG. 3.

Figure 4:
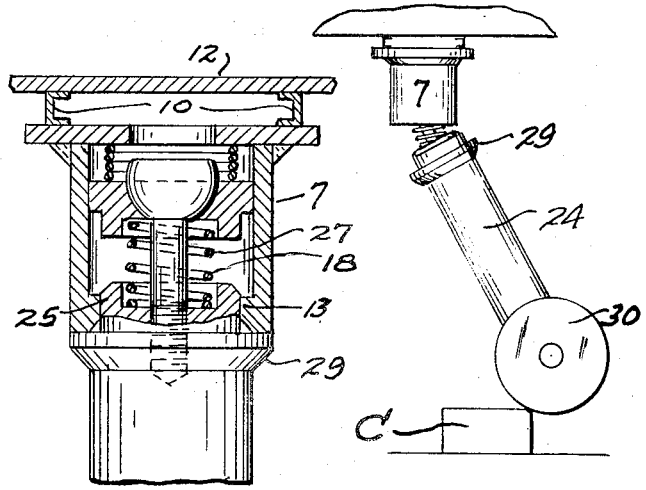
FIG. 4 is a side view of the landing gear inclined from its normal upright position by engagement with an obstruction on the ground as the trailer is moved about by the truck.
Figure 5:
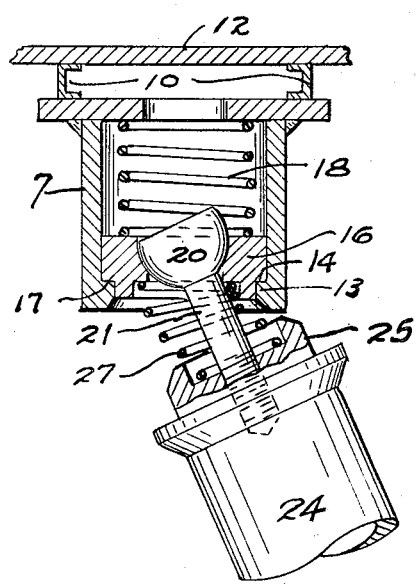
FIG. 5 is a section corresponding to FIG. 3 but with the unloaded landing gear inclined as shown in FIG. 4.

When the trailer is being moved by the truck, leg 24 is off the ground. If its wheel 30 engages a curb C or other obstruction as indicated in FIG. 4, the leg, ball 20 and stem 21 may incline as indicated in FIG. 5, but the leg cannot then telescope into the housing because shank 25 will abruptly engage the housing neck 13 as shown in FIG. 5.

The structure permits the lower portion of the landing gear to yield laterally throughout 360° when it contacts an obstruction on the ground, and avoids damaging the landing gear which is one of the major types of damage to trailers particularly when a manually retracted landing gear is not cranked up its full height.

The details of the structure may be varied without departing from the spirit of the invention, which contemplates lateral yielding of the leg as may be required to ride over an obstacle.

I claim:

1. Landing gear for a transportation trailer having a body with supporting wheels near one end and a truck-engaging member spaced from said wheels, including at its upper end a rigid housing adapted for rigid attachment to the underside of the trailer body near the truck-engaging member, a ball and socket joint structure slidable vertically in said housing and a rigid support leg depending from said structure and means for selectively holding said leg in a retracted load supporting position and extended yielding position, said leg thereby being adapted to incline in different directions relative to the body by yielding laterally to obstructions on the ground as the trailer is moved about.

2. Landing gear as described in claim 1 in which the housing opens downwardly and a piston-like element is slidable vertically in said housing, a vertically compressible spring in the housing thrusts said element downwardly, said support leg depends below the housing, and said ball and socket joint structure connects said element and support leg.

3. Landing gear as described in claim 2 in which there is an upwardly facing shoulder on the lower end of said housing and a downwardly facing shoulder on said piston-like element, said spring thrusting said element and said support leg downwardly to engage said shoulders but yielding to telescoping movement of said support leg.

4. Landing gear as described in claim 1 in which the housing and the support leg are connected by the ball and socket joint structure, there being spring means normally holding said housing and support leg in vertical alignment but yielding to accommodate lateral movement of the lower end of the support leg.

5. Landing gear as described in claim 2 in which the support leg includes an upper part slidable vertically in the housing but restrained from lateral movement therein, there being a coil spring compressed between said upper part and the inner end of the hosing and thrusting the support leg outwardly of the housing.

* * * * *